United States Patent
Hong

(10) Patent No.: US 9,277,089 B2
(45) Date of Patent: Mar. 1, 2016

(54) METHOD TO CONTROL IMAGE PROCESSING APPARATUS, IMAGE PROCESSING APPARATUS, AND IMAGE FILE

(71) Applicant: SAMSUNG Electronics Co., Ltd., Suwon-si, Gyeonggi-do (KR)

(72) Inventor: Dong Ki Hong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/026,026

(22) Filed: Sep. 13, 2013

(65) Prior Publication Data

US 2014/0016002 A1 Jan. 16, 2014

Related U.S. Application Data

(63) Continuation of application No. 12/397,397, filed on Mar. 4, 2009, now Pat. No. 8,558,918.

(30) Foreign Application Priority Data

Jul. 2, 2008 (KR) .......................... 10-2008-0063949

(51) Int. Cl.
*H04N 5/76* (2006.01)
*H04N 1/32* (2006.01)
(Continued)

(52) U.S. Cl.
CPC ...... *H04N 1/32128* (2013.01); *G06F 17/30817* (2013.01); *G11B 27/3027* (2013.01);
(Continued)

(58) Field of Classification Search
CPC ......... H04N 5/76; H04N 5/772; H04N 5/781; H04N 2201/3228; H04N 2201/3229; H04N 1/32128; H04N 5/85; H04N 5/907; H04N 9/8205; G11B 27/3027; G11B 2220/65; G11B 27/34; G06F 17/30817
USPC ............... 348/333.05, 333.11, 231.2, 231.3, 348/231.5, 231.99
See application file for complete search history.

(56) References Cited

U.S. PATENT DOCUMENTS

2003/0174217 A1* 9/2003 Kito et al. ............... 348/231.2
2007/0174881 A1* 7/2007 Idehara et al. ............ 725/90

FOREIGN PATENT DOCUMENTS

WO 2005104127 11/2005

OTHER PUBLICATIONS

Office Action issued in CN200980125807.5 dated Nov. 20, 2012.
(Continued)

*Primary Examiner* — Yogesh Aggarwal
(74) *Attorney, Agent, or Firm* — Staas & Halsey LLP

(57) ABSTRACT

A method to control an image processing apparatus includes obtaining linkage information representing a relation between a plurality of image files and recording the linkage information as metadata in each of the plurality of image files. This method ensures that a large number of image files are more easily and conveniently classified since linkage information representing relations between a plurality of image files is recorded as metadata in each of the plurality of image files.

22 Claims, 19 Drawing Sheets

(51) Int. Cl.
*G06F 17/30* (2006.01)
*G11B 27/30* (2006.01)
*G11B 27/34* (2006.01)
*H04N 5/77* (2006.01)
*H04N 5/781* (2006.01)
*H04N 5/85* (2006.01)
*H04N 5/907* (2006.01)
*H04N 9/82* (2006.01)

(52) U.S. Cl.
CPC ............ *G11B 27/34* (2013.01); *H04N 5/76* (2013.01); *H04N 5/772* (2013.01); *H04N 5/781* (2013.01); *H04N 5/85* (2013.01); *H04N 5/907* (2013.01); *H04N 9/8205* (2013.01); *H04N 2201/3228* (2013.01); *H04N 2201/3229* (2013.01)

(56) References Cited

OTHER PUBLICATIONS

Office Action mailed Nov. 3, 2011 in U.S. Appl. No. 12/397,397 (now patented as U.S. Pat. No. 8,558,918).

Final Office Action mailed Apr. 10, 2012 in U.S. Appl. No. 12/397,397 (now patented as U.S. Pat. No. 8,558,918).

Office Action mailed Oct. 10, 2012 in U.S. Appl. No. 12/397,397 (now patented as U.S. Pat. No. 8,558,918).

Final Office Action mailed Mar. 22, 2013 in U.S. Appl. No. 12/397,397 (now patented as U.S. Pat. No. 8,558,918).

Notice of Allowance mailed Jun. 13, 2013 in U.S. Appl. No. 12/397,397 (now patented as U.S. Pat. No. 8,558,918).

\* cited by examiner

FIG. 2

| ITEM | VALUE |
|---|---|
| MAKER | SAMSUNG |
| MODEL | SAMSUNG GX-10 |
| SOFTWARE | PHOTOWORKS |
| EXIF VERSION | "0221" |
| TIME | 2008-04-01 16:44:17 |
| IMAGE SIZE | 3872 X 2592 |
| EXPOSURE TIME | 1/250S |
| F-NUMBER | F 2.8 |
| EXPOSURE PROGRAM | APERTURE PRIORITY |
| ISO SPEED RATINGS | ISO 200 |
| EXPOSURE BIAS VALUE | EV -0.3 |
| METERING MODE | SPOT |
| FLASH | OFF COMPULSORY |
| FOCAL LENGTH | 24 mm |
| WHITE BALANCE | AUTO |
| MACRO | OFF |
| GPS | E 127° 2' 11"<br>N 37° 20' 31" |
| ID | F2 |
| LINK | UPPER : F3<br>LOWER : F1 |

FIG. 3
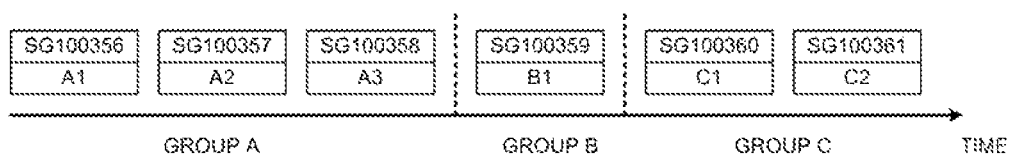
(A)
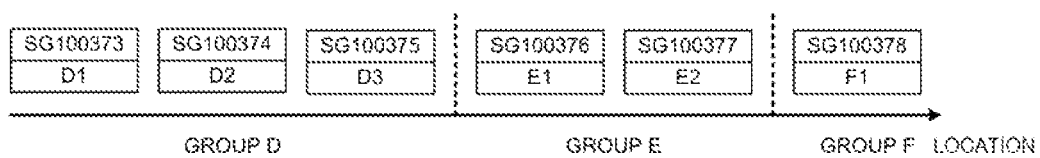
(B)

FIG. 5C

| File Name : SG100036 ||
|---|---|
| TIME | 2008/03/16 10:18:31 |
| GPS | E 112° 42' 39"<br>N 233° 32' 12" |
| ID | F2 |
| LINK | UPPER : NONE<br>LOWER : NONE |

| File Name : SG100037 ||
|---|---|
| TIME | 2008/04/01 16:47:03 |
| GPS | E 127° 2' 11"<br>N 37° 20' 31" |
| ID | F1 |
| LINK | UPPER : NONE<br>LOWER : NONE |

FIG. 5D

| File Name : SG100035 ||
|---|---|
| TIME | 2008/03/16 10:11:15 |
| GPS | E 112° 42' 39"<br>N 233° 32' 12" |
| ID | F3 |
| LINK | UPPER : NONE<br>LOWER : F2 |

| File Name : SG100036 ||
|---|---|
| TIME | 2008/03/16 10:18:31 |
| GPS | E 112° 42' 39"<br>N 233° 32' 12" |
| ID | F2 |
| LINK | UPPER : F3<br>LOWER : NONE |

| File Name : SG100037 ||
|---|---|
| TIME | 2008/04/01 16:47:03 |
| GPS | E 127° 2' 11"<br>N 37° 20' 31" |
| ID | F1 |
| LINK | UPPER : NONE<br>LOWER : NONE |

FIG. 14
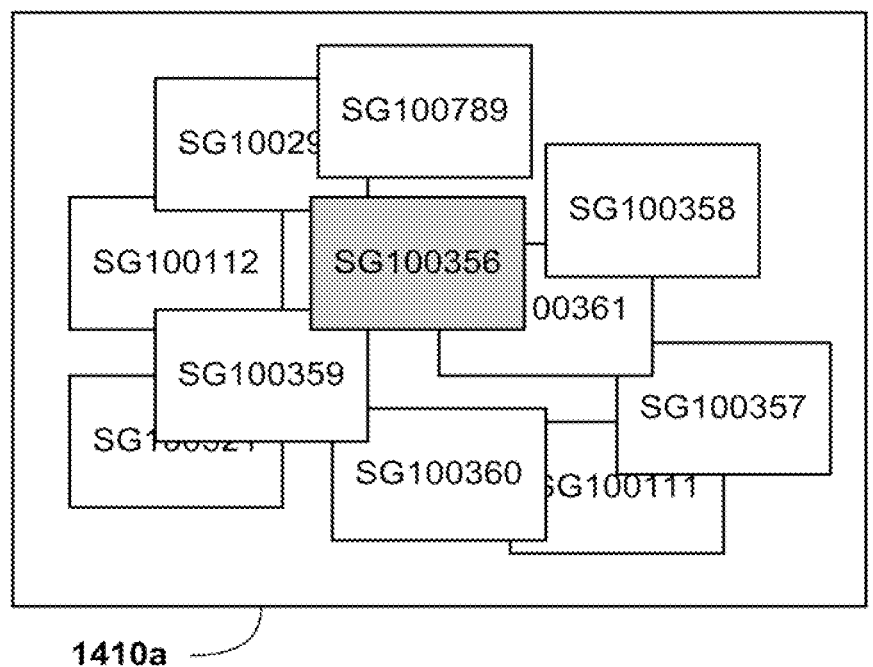
1410a
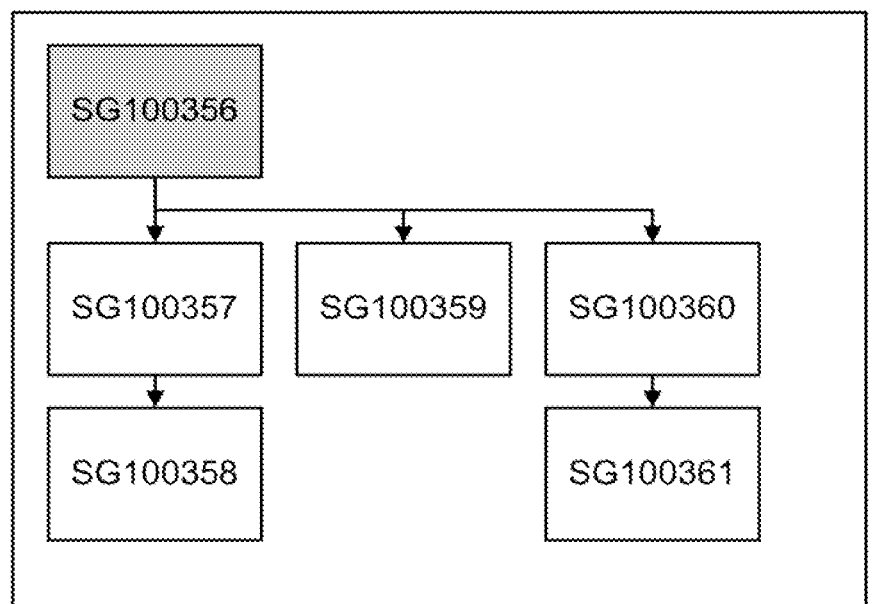
1410b

METHOD TO CONTROL IMAGE PROCESSING APPARATUS, IMAGE PROCESSING APPARATUS, AND IMAGE FILE

CROSS-REFERENCE TO RELATED APPLICATIONS

This is a Continuation Application of prior Application No.: 12/397,397, filed on Mar. 4, 2009 in the United States Patent and Trademark Office, which claims priority under 35 U.S.C. §119(a) from Korean Patent Application No. 10-2008-0063949, filed on Jul. 2, 2008 in the Korean Intellectual Property Office, the disclosures of which are incorporated herein.

BACKGROUND OF THE INVENTION

1. Field of the Invention

The present general inventive concept relates to an image file, an image processing apparatus, and a method to control an image processing apparatus, and more particularly, to an image file, an image processing apparatus, and a method to control an image processing apparatus such as a digital camera to capture and record (store) images in a file format or an image viewer of a computer, a PMP, or the like.

2. Description of the Related Art

Digital image processing apparatuses such as digital cameras or digital camcorders have become generalized and widely used along with development of image capture technologies and digital signal processing technologies. A number of image files created through image capture (or shooting) is rapidly increasing since digital image capture devices that use storage devices with relatively large storage capacity are not negatively impacted by the capacity of storage for recording captured images, unlike classical analog image capture devices. Users typically classify and store captured image files by events.

However, as the number of image files has significantly increased, classifying and managing image files by users is increasingly difficult. Users generally classify image files by time or event. However, in this case, all image files that were created at the same date are classified as the same group based on a creation date and are not generally discriminated amongst each other.

In addition, searching for images that satisfy a specific condition in a large amount of image files to be checked one by one by a user takes a long period of time.

SUMMARY OF THE INVENTION

The present general inventive concept provides an image file, an image processing apparatus, and a method to control an image processing apparatus, wherein linkage information representing relations between a plurality of image files is recorded as metadata in each of the plurality of image files, so that a large number of image files are more easily and conveniently classified.

Additional aspects and/or utilities of the general inventive concept will be set forth in part in the description which follows and, in part, will be obvious from the description, or may be learned by practice of the general inventive concept.

The foregoing and/or other aspects and utilities of the present general inventive concept may be achieved by providing a method to control an image processing apparatus, the method including obtaining linkage information representing a relation between a plurality of image files, and recording the linkage information as metadata in each of the plurality of image files.

The method may further include identifying image files satisfying a predetermined condition among the plurality of image files based on the linkage information.

The method may further include determining a link relation between the plurality of image files based on the linkage information.

The linkage information recorded in the metadata of each of the plurality of image files may include information of levels, relative to the image file, of other image files of the plurality of image files, the relative levels being classified into upper and lower levels.

The foregoing and/or other aspects and utilities of the present general inventive concept may also be achieved by providing a method to control an image processing apparatus, the method including obtaining a plurality of image files created by one shooting operation in a continuous shooting mode, obtaining linkage information representing a relation between the plurality of image files based on an order in which the plurality of image files are created, and recording the linkage information as metadata in each of the plurality of image files.

The linkage information recorded in the metadata of each of the plurality of image files may include information of levels, relative to the image file, of other image files of the plurality of image files, the relative levels being classified into upper and lower levels.

A first created image file among the plurality of image files may be classified as an upper level and each of remaining image files among the plurality of image files may be classified as a lower level.

The image processing apparatus may be a digital camera, and at least one photograph is taken while a user presses a shutter release button of the digital camera in the continuous shooting mode to create at least one corresponding image file.

The foregoing and/or other aspects and utilities of the present general inventive concept may also be achieved by providing a method to control an image processing apparatus, the method including displaying a plurality of image files on a screen, receiving a determination of a relation between the plurality of image files, obtaining linkage information representing a relation between the plurality of image files based on a selection made for the determination of the relation, and recording the linkage information as metadata in each of the plurality of image files.

The linkage information recorded in the metadata of each of the plurality of image files may include information of levels, relative to the image file, of other image files of the plurality of image files, the relative levels being classified into upper and lower levels.

The determination of the relation between the plurality of image files may include selecting an image file from the plurality of image files as an upper-level image file and selecting each of remaining image files among the plurality of image files as a lower-level image file.

The image processing apparatus may include a display unit to display the plurality of image files on a screen, and the selection of the upper and lower-level image files of the plurality of image files is made through a user selection for the plurality of image files displayed on the screen of the display unit.

The foregoing and/or other aspects and utilities of the present general inventive concept may also be achieved by providing a method to control an image processing apparatus, the method including obtaining a first image file; obtaining a second image file created as the first image file is edited, obtaining linkage information representing a relation between the first and second image files, and recording the linkage information as metadata in each of the first and second image files.

Linkage information recorded in metadata of each of a plurality of image files may include the first and second image files includes information of levels, relative to the image file, of other image files of the plurality of image files, the relative levels being classified into upper and lower levels.

The first image file may be classified as an upper level and the second image file created as the first image file is edited is classified as a lower level.

The method may further include obtaining a third image file created as the second image file is edited, and classifying the second image file as an upper level above the third image file and classifying the third image file created as the second image file is edited as a lower level below the second image file.

The foregoing and/or other aspects and utilities of the present general inventive concept may also be achieved by providing a method to control an image processing apparatus, the method including displaying a plurality of image files, each including metadata in which linkage information representing a relation with other image files is recorded, on a screen, reading the linkage information of each of the plurality of image files, and displaying the plurality of image files at new display positions determined based on the linkage information.

The linkage information recorded in the metadata of each of the plurality of image files may include information of levels, relative to the image file, of other image files of the plurality of image files, the relative levels being classified into upper and lower levels.

The display positions of the plurality of image files may be determined based on the relative levels of the plurality of image files.

The foregoing and/or other aspects and utilities of the present general inventive concept may also be achieved by providing an image processing apparatus including a storage unit to store a plurality of image files, and a controller to obtain linkage information representing a relation between the plurality of image files and to record the linkage information as metadata in each of the plurality of image files.

The foregoing and/or other aspects and utilities of the present general inventive concept may also be achieved by providing an image file including image data, and metadata in which linkage information representing a relation with other image files is recorded.

The linkage information recorded in the metadata of the image file may include information of levels, relative to the image file, of the other image files, the relative levels being classified into upper and lower levels.

BRIEF DESCRIPTION OF THE DRAWINGS

These and/or other aspects and utilities of the general inventive concept will become apparent and more readily appreciated from the following description of the embodiments, taken in conjunction with the accompanying drawings of which:

FIG. 2 illustrates metadata of an image file according to an embodiment of the present general inventive concept;

FIGS. 3A and 3B illustrate a method to classify image files according to an embodiment of the present general inventive concept;

FIGS. 5A to 5E illustrate link relations of image files created by the method to control an image processing apparatus illustrated in FIGS. 4A and 4B;

FIG. 14 illustrates how image files are displayed according to the method to control an image processing apparatus illustrated in FIG. 13.

DETAILED DESCRIPTION OF THE PREFERRED EMBODIMENTS

Figure 1:
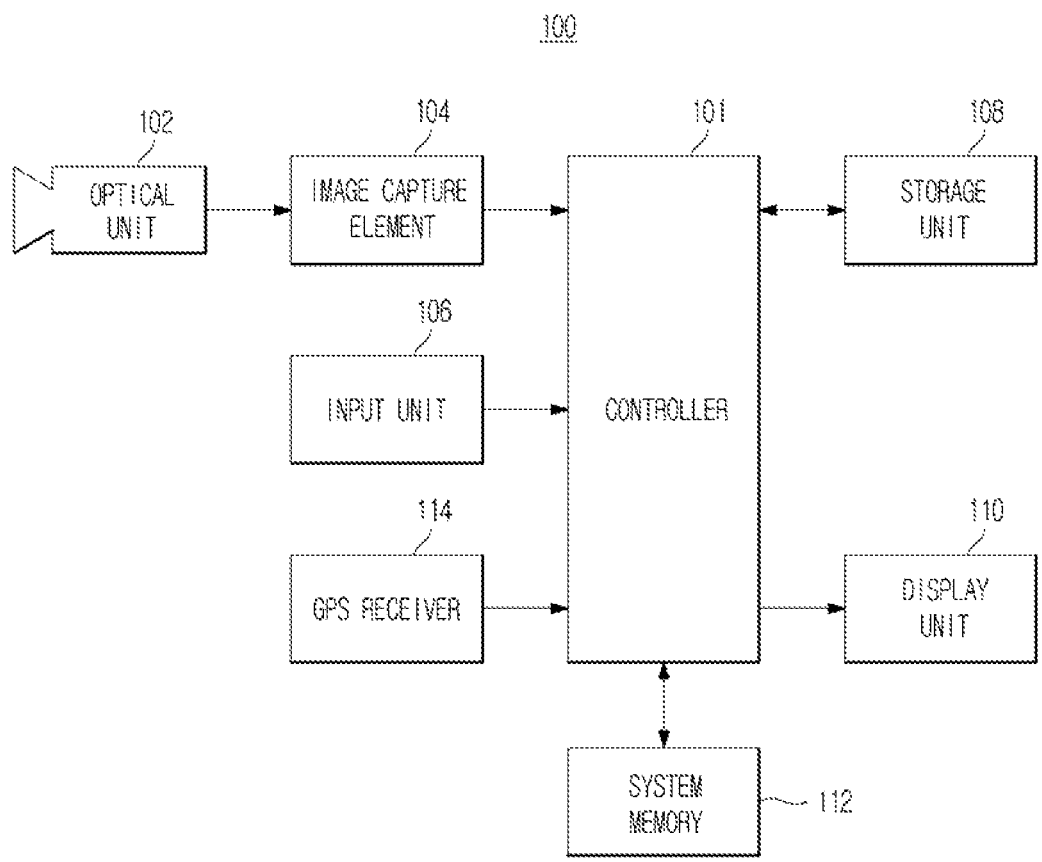
FIG. 1 illustrates a system to control an image processing device according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

FIG. 1 illustrates a system to control an image processing device according to an embodiment of the present general inventive concept. As illustrated in FIG. 1, an image capture element 104, an input unit 106, and a GPS receiver 114 are electrically connected to an input of a controller 101 such that communication is possible therebetween. Light incident through an optical unit 102 is converted into an electrical signal through the image capture element 104 and the electrical signal is then input to the controller 101. The input unit 106 includes a plurality of buttons provided on the image processing device 100 and a user interface implemented as a touch screen on a display unit 110. The GPS receiver 114 receives signals from GPS satellites and obtains information of the current time and coordinates (longitude and latitude) of a position, at which the image processing device 100 is located, from the received signals. System software that the controller 101 uses to control an overall operation of the image processing device 100 is stored in a system memory 112.

A storage unit 108 and the display unit 110 are electrically connected to an output of the controller 101 such that communication is possible therebetween. Images created by the image processing device 100 are stored in the storage unit 108. Examples of the storage unit 108 include a hard disk drive, a memory card, an optical disc, a magnetic tape, and the like. The display unit 110 displays images handled at the image processing device 100 and supports a touch screen to display a menu or the like for manual operation of the image processing device 100.

The controller 101 of the image processing device 100 illustrated in FIG. 1 determines a link relation between image files created or processed at the image processing device 100 and records the determined link relation between the image files in metadata of each the image files. If a link relation of an image file that has already been recorded in metadata is changed, the controller 101 updates the link relation recorded in the metadata of the image file.

FIG. 2 illustrates metadata of an image file according to an embodiment of the present general inventive concept. Metadata is a type of attribute information and can be considered "data about data". Metadata is data that is assigned to content according to a predetermined rule so as to efficiently search for and use desired information from among a large amount of information. The metadata illustrated in FIG. 2 is metadata of an image file (photograph) captured by a digital camera that is represented in an EXchangeable Image File format (EXIF). The EXIF information, in which detailed additional information such as the manufacturer, model, lens, and capture conditions of the digital camera is recorded, is stored in the image file of the digital camera. The following table describes a variety of items of the metadata illustrated in FIG. 2.

| ITEMS | DESCRIPTIONS |
|---|---|
| MAKER | device (camera)'s manufacturer |
| MODEL | device (camera)'s model name |
| SOFTWARE | image processing software used most recently |
| EXIF VERSION | EXIF version |
| TIME | file creation (capture) time |
| IMAGE SIZE | vertical × horizontal size of image (in units of pixels) |
| EXPOSURE TIME | exposure time |
| F-NUMBER | focal ratio |
| EXPOSURE PROGRAM | exposure mode |
| ISO SPEED RATINGS | ISO value |
| EXPOSURE BIAS VALUE | exposure correction value |
| METERING MODE | metering mode |
| FLASH | whether flash is enabled or disabled |
| FOCAL LENGTH | focal length |
| WHITE BALANCE | white balance |
| MACRO | whether macro mode is used |
| GPS | E: east coordinate<br>N: north coordinate |
| ID | Identification |
| LINK | represent link relation with other image files in a group including the image file<br>UPPER: upper-level image file's ID<br>LOWER: lower-level image file's ID |

Specifically, the creation (capture) time indicates the time when the image file was created (or when a corresponding image was captured). The capture position (GPS coordinates) indicates the coordinates (specifically, east and north coordinates) of the capture position of the image file received from GPS satellites. The creation (capture) time is obtained from a clock embedded in the image processing device 100 or from GPS signals. Apart from a file name of each image file in a group including one or more image files, an ID is uniquely assigned to each image file in the group. When an image file is associated with other image files in a group to which the image file belongs, the link relation LINK of the image file represents an upper or lower-level link relation with each of the other image files. The link relation LINK in the metadata of the image file illustrated in FIG. 2 represents that another image file F3 is linked as an upper-level image file to an image file F2 including this metadata and another image file F1 is linked as a lower-level image file to the image file F2. That is, a group including the image file F2 has a link relation of F3→F2→F1.

FIGS. 3A and 3B illustrate a method to classify image files according to an embodiment of the present general inventive concept. Specifically, FIG. 3A illustrates classification of a plurality of image files based on the creation time (for example, capture time) and FIG. 3B illustrates classification of a plurality of image files based on the creation position (for example, capture position).

Classification criteria other than the creation time and position described above may also be applied to classify the image files. For example, when the image files are photographs, the image files may be classified based on the focal distance, the white balance, the exposure time, the f-number, the ISO value, the metering mode, whether the flash is used, the camera or lens model used to capture the images, etc. When the image files are general image files, the image files may be classified based on a used color space or application program, extension (JPG, TIF, BMP, etc), whether the image has been edited by the user, etc.

In the classification method illustrated in FIG. 3A, the creation times of image files are compared and, if the difference between the creation times is less than a preset value (for example, one hour or day), the compared image files are classified as one group of associated image files. Alternatively, if the difference between the creation times is equal to or greater than the preset value, a determination is made that the compared image files are not associated so that the compared files are classified into different groups. In FIG. 3A, image files SG100356, SG100357, and SG100358 are classified as a group A since the difference between the creation times of the image files is less than the preset value. In addition, an image file SG100359 is classified as another group B since the difference between the creation times of the image file SG100359 and the image file SG100358 created immediately beforehand is greater than the preset value. In addition, image files SG100360 and SG100361 are classified as another group C since the difference of the creation times of the image files SG100360 and SG100361 from that of the image file SG100359 created immediately beforehand is greater than the preset value. In addition to a file name, a unique ID is assigned to each of the image files that are classified into the three groups A, B, and C. The IDs of the image files of each group have a different head character from the image files of other groups so as to enable identification of the group to which the image file belongs. Specifically, the image files of the group A have IDs of A1, A2, and A3, and the image file of the group B has an ID of B1, and the image files of the group C have IDs of C1 and C2. The head character and the serial number of each ID may be set in a different fashion from that described above as needed.

In the case of FIG. 3B, the creation positions of image files are compared and, if the difference between the creation positions is less than a preset value, the compared image files are classified as one group of associated image files. Alternatively, if the difference between the creation positions is equal to or greater than the preset value, a determination is made that the compared image files are not associated so that the compared files are classified into different groups. In FIG. 3B, image files SG100373, SG100374, and SG100375 are classified as a group D since the difference between the creation positions of the image files is less than the preset value. In addition, image files SG100376 and SG100377 are classified as another group E since the difference of the creation positions of the image files SG100376 and SG100377 from that of the image file SG100375 created immediately beforehand is greater than the preset value. In addition, an image file SG100378 is classified as another group F since the difference of the creation position of the image file SG100378 from that of the image file SG100377 created immediately beforehand is greater than the preset value. In addition to a file name, a unique ID is assigned to each of the image files that are classified into the three groups D, E, and F. The IDs of the image files of each group have a different head character from the image files of other groups so as to enable identification of the group to which the image file belongs. Specifically, the image files of the group D have IDs of D1, D2, and D3, and the image files of the group E have IDs of E1 and E2, and the image file of the group F has an ID of F1. The head character and the serial number of each ID may be set in a different fashion from that described above as needed.

Figure 4A:
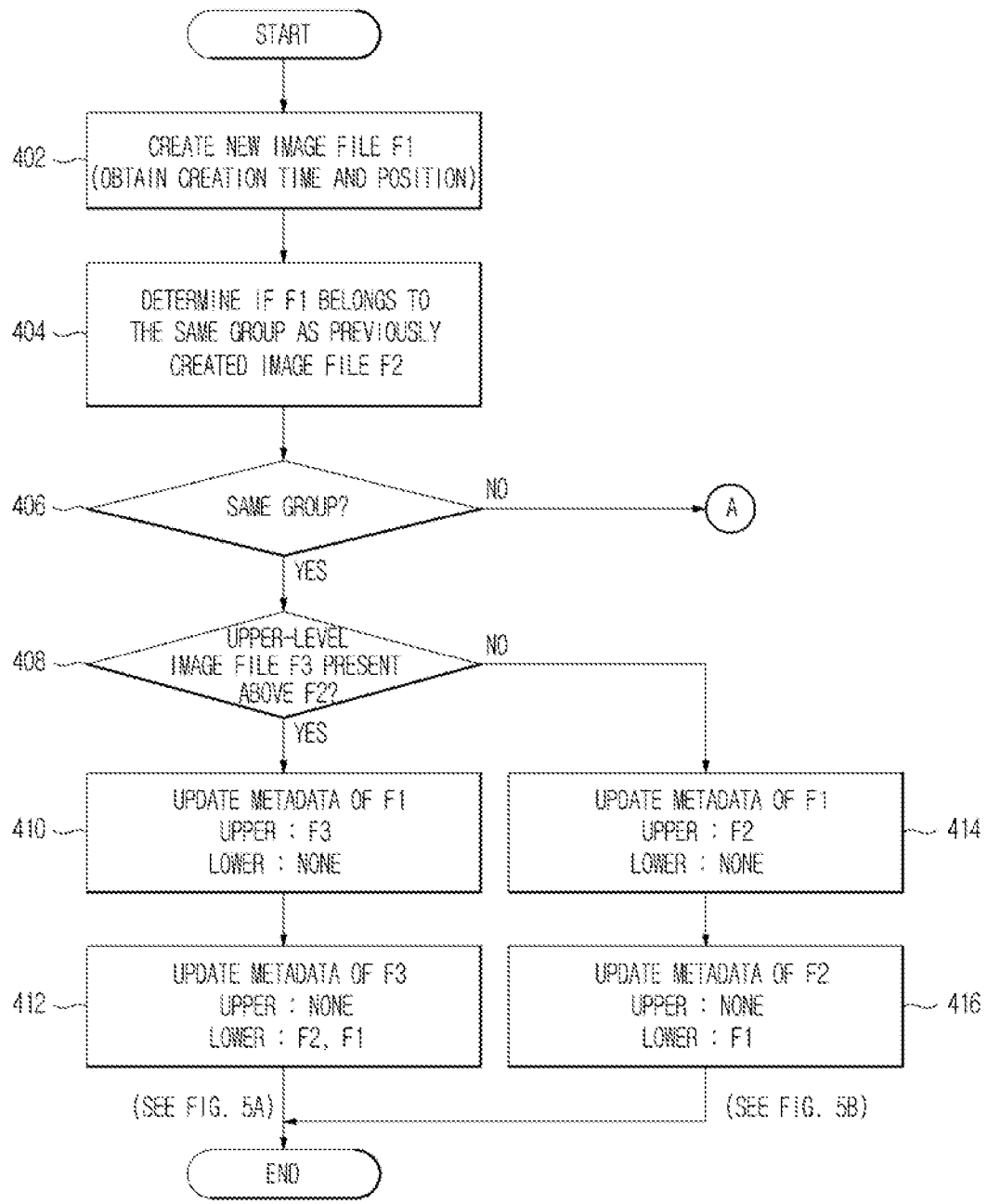
FIGS. 4A and 4B illustrate a method to control an image processing apparatus according to an embodiment of the present general inventive concept.
Figure 4B:
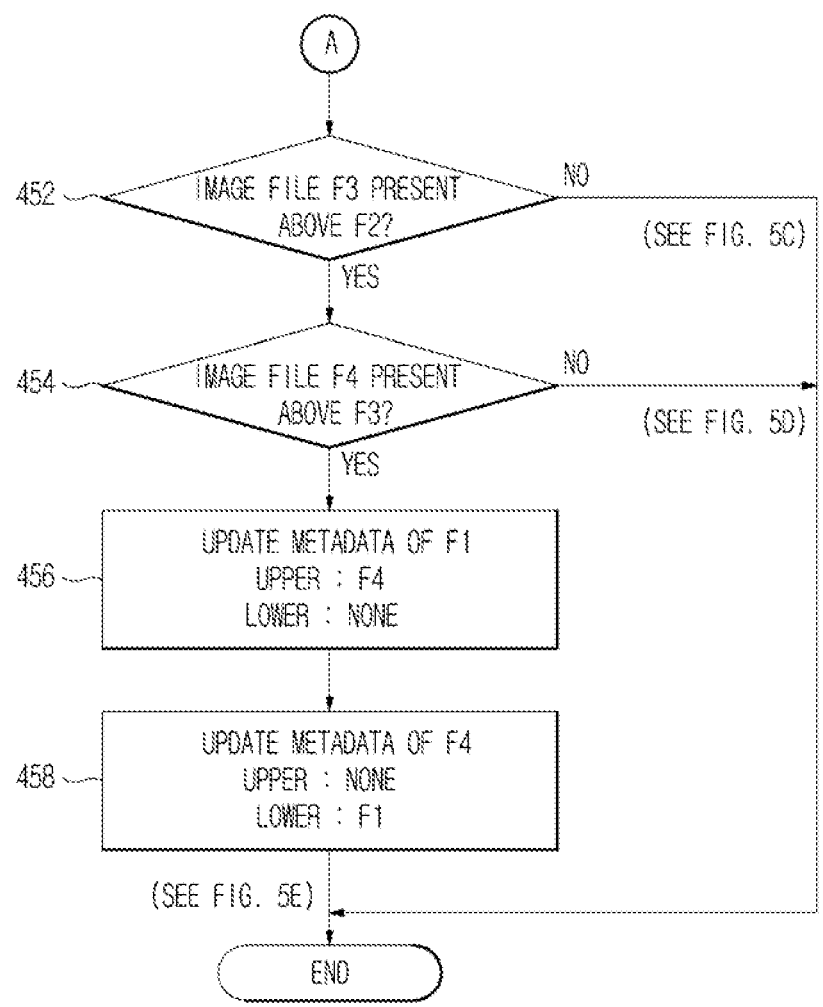

FIGS. 4A and 4B illustrate a method to control an image processing apparatus according to an embodiment of the present general inventive concept and FIGS. 5A to 5E illustrate link relations of image files created by the method to control an image processing apparatus illustrated in FIGS. 4A and 4B. As illustrated in FIG. 4A, when a new image file F1 is created, the controller 101 obtains information of a creation time and a creation position of the created image file F1 (operation 402). The controller 101 then determines whether the newly created image file F1 belongs to the same group as that of an image file F2 created immediately before the image file F1 (operation 404). Whether the image files F1 and F2 belong to the same group is determined based on the difference between the creation times or positions of the two image files as described above with reference to FIG. 3. If the two image files F1 and F2 belong to the same group ("yes" in operation 406), the controller 101 determines whether another image file (for example, F3) is present above (i.e., present at an upper level above) the immediately previously captured image file F2 (operation 408). Whether an upper-level image file F3 is present is determined through a link relation LINK in metadata of the image file F2.

Figure 5A:

If another image file F3 has been linked as an upper-level image file to the image file F2 ("yes" in operation 408), the image file F3 is also at a level above the image file F1 belonging to the same group as that of the image file F2. Accordingly, taking into consideration this relation, the link relation LINK in the metadata of the image file F1 is updated such that the image file F3 is linked as an upper-level image file to the image file F1 and no lower-level image file is linked to the image file F1 (operation 410). The link relation LINK in the metadata of the image file F3 is also updated such that no upper-level image file is linked to the image file F3 and the two image files F2 and F1 are linked as lower-level image files to the image file F3. As a result of this procedure, the three image files F3, F2, and F1 constitute one group. FIG. 5A illustrates relations between the image files F3, F2, and F1 of the group constituted in this manner. As illustrated in FIG. 5A, three image files having IDs of F1, F2, and F3 constitute one group. The image file F3 is linked as an upper-level image file in this group and the two image files F2 and F1 are linked as lower-level image files to the image file F3.

Figure 5B:

Returning to FIG. 4A, if no image file F3 is present above the image file F2 ("no" in operation 408), the two image files F2 and F1 constitute one group. Taking into consideration this relation, the link relation LINK in the metadata of the image file F1 is updated such that the image file F2 is linked as an upper-level image file to the image file F1 and no lower-level image file is linked to the image file F1 (operation 414). The link relation LINK in the metadata of the image file F2 is also updated such that no upper-level image file is linked to the image file F2 and the image file F1 is linked as a lower-level image file to the image file F2. As a result of this procedure, the two image files F2 and F1 constitute one group. FIG. 5B illustrates relations between the image files F2 and F1 of the group constituted in this manner. As illustrated in FIG. 5B, two image files having IDs of F1 and F2 constitute one group. The image file F2 is linked as an upper-level image file in this group and the image file F1 is linked as a lower-level image file to the image file F2.

Alternatively, if the newly created image file F1 and the immediately previously created image file F2 do not belong to the same group ("no" in operation 406), the controller 101 determines whether another image file (for example, F3) is present above the immediately previously created image file F2 (operation 452 in FIG. 4B). Whether an upper-level image file F3 is present is determined based on the link relation LINK in the metadata of the image file F2. If the two image files F2 and F1 do not belong to the same group and no image file F3 is also present above the image file F2 ("no" in operation 452), the two image files F2 and F1 have no link relation as illustrated in FIG. 5C. Since the creation times and the creation positions of the newly created image file F1 and the immediately previously created image file F2 are significantly different, the two image files F1 and F2 belong to different groups and thus have no link relation as can be seen from FIG. 5C.

Returning to FIG. 4B, the controller 101 determines whether another image file (for example, F4) is present above the image file F3 (operation 454). Whether another upper-level image file F4 is present is determined based on the link relation LINK in the metadata of the image file F3. If no upper-level image file F4 is present above the image file F3 ("no" in operation 454), only the two image files F3 and F2 have an upper and lower-level link relation while the newly created image file F1 has no link relation with the remaining two image files F3 and F2 as can be seen from FIG. 5D.

Figure 5E:
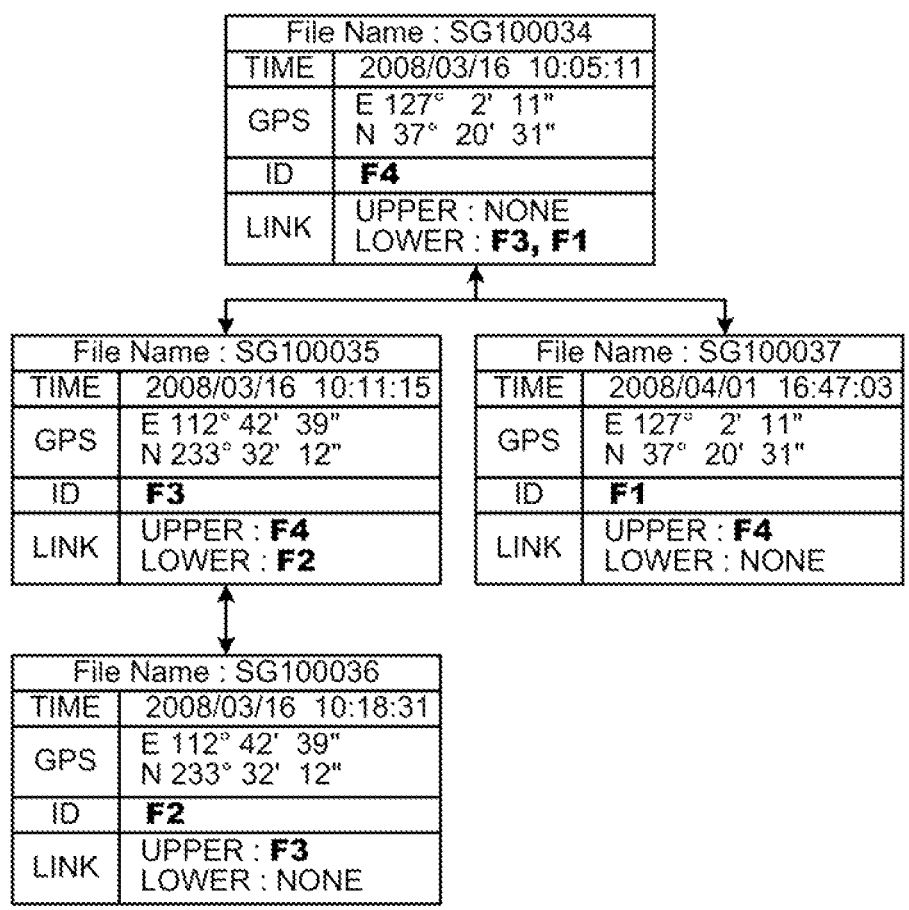

Alternatively, if another upper-level image file (for example, F4) is present above the image file F3 ("yes" in operation 454), the four image files F4, F3, F2, and F1 have a link relation with each other such that the respective image files all belong to the same group. Accordingly, taking into consideration this relation, the link relation LINK in the metadata of the image file F1 is updated such that the image file F4 is linked as an upper-level image file to the image file F1. The link relation LINK in the metadata of the image file F2 is also updated such that the image file F3 is linked as an upper-level image file to the image file F2 and no lower-level image file is linked to the image file F2. The link relation LINK in the metadata of the image file F3 is also updated such that the image file F4 is linked as an upper-level image file to the image file F3 and the image file F2 is linked as a lower-level image file to the image file F3. The link relation LINK in the metadata of the image file F4 is also updated such that no upper-level image file is linked to the image file F4 and the image files F3 and F1 are linked as lower-level image files to the image file F4. As a result of this procedure, the four image files F4, F3, F2, and F1 constitute one group. FIG. 5E illustrates relations between the image files F4, F3, F2, and F1 of the group constituted in this manner. As illustrated in FIG. 5E, the three image files F2, F3, and F4 have a series-link relation such that the image file F3 is linked as an upper-level image file to the image file F2 and the image file F4 is linked as an upper-level image file to the image file F3. In addition, the newly created image file F1 is linked to the uppermost-level image file F4 such that the four image files F4, F3, F2, and F1 constitute one group.

Figure 6:
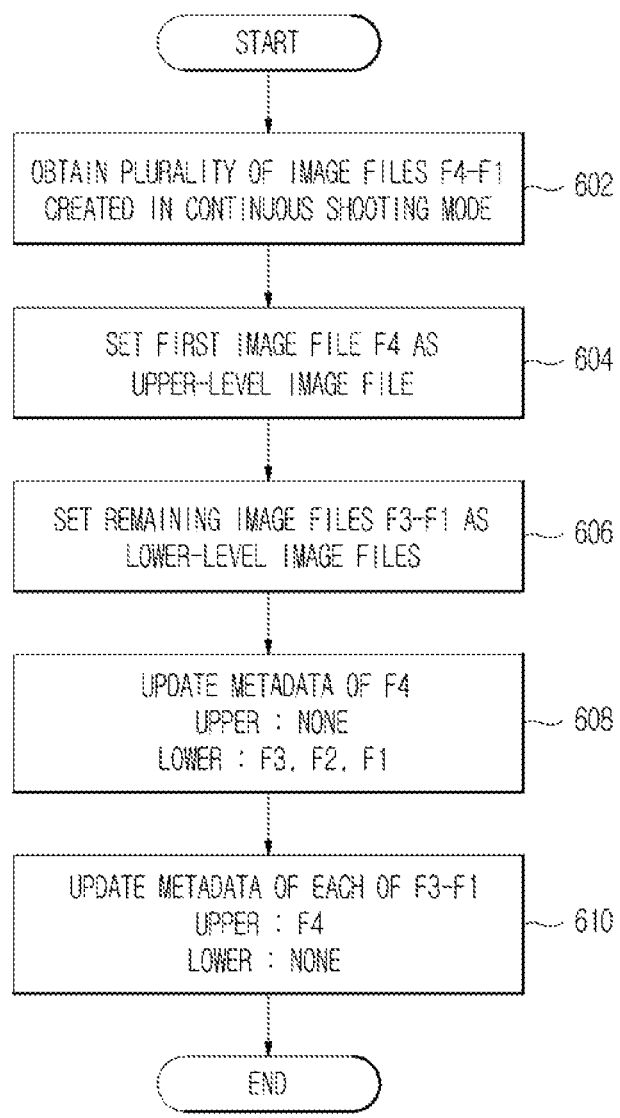
FIG. 6 illustrates a method to control an image processing apparatus according to another embodiment of the present general inventive concept.
Figure 7:
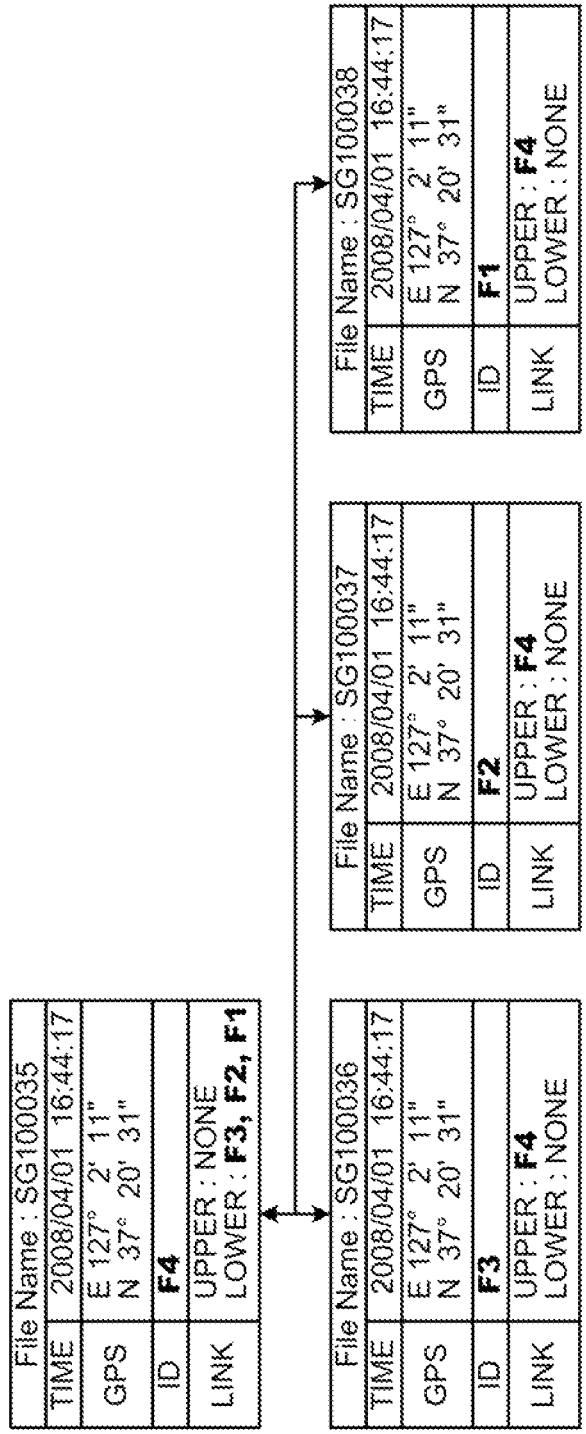
FIG. 7 illustrates link relations of image files created by the method to control an image processing apparatus illustrated in FIG. 6.

FIG. 6 illustrates a method to control an image processing apparatus according to another embodiment of the present general inventive concept and FIG. 7 illustrates link relations of image files created by the method to control an image processing apparatus illustrated in FIG. 6. Here, the method to control an image processing apparatus illustrated in FIG. 6 is applied as a method to process a plurality of image files created in a continuous shooting mode of a digital camera that is a type of image processing apparatus. In the continuous shooting mode of the digital camera, the shutter is automatically released repeatedly a number of times while the user presses a shutter release button, thereby taking a series of photographs.

First, as illustrated in FIG. 6, the controller 101 obtains a plurality of image files created in the continuous shooting mode of the image processing device 100 (a digital camera in this embodiment) (operation 602). The plurality of image files created in the continuous shooting mode sufficiently satisfies the condition for constituting one group since the creation (shooting or capture) times of the image files are at very small intervals (typically, 3 to 7 or more photographs are taken per second) and the photographs are taken at the same place. When the plurality of image files F4 to F1 created in the continuous shooting mode is obtained, the controller 101 sets the first captured image file F4 among the plurality of image files F4, F3, F2, and F1 as an upper-level image file (operation 604). The controller 101 then sets the image files F3, F2, and F1 other than the first captured image file F4 as lower-level image files (operation 606). When the setting of the link relation of the plurality of image files F4, F3, F2, and F1 is completed, the controller 101 updates the link relation LINK in metadata of each of the image files F4, F3, F2, and F1. Specifically, the controller 101 updates the link relation LINK in the metadata of the image file F4 such that no upper-level image file is linked to the image file F4 and three lower-level image files F3, F2, and F1 are linked to the image file F4 (operation 608). In addition, the controller 101 updates the link relation LINK in the metadata of each of the remaining image files F3, F2, AND F1 such that the first created image file F4 is linked as an upper-level image file to the image file and no lower-level image file is linked to the image file (operation 610).

As a result of this procedure, the four image files F4, F3, F2, and F1 created in the continuous shooting mode constitute one group. FIG. 7 illustrates relations between the image files F4, F3, F2, and F1 of the group constituted in this manner. As illustrated in FIG. 7, no upper-level image file is linked to the first created image file F4 among the plurality of image files F4, F3, F2, and F1 created in the continuous shooting mode and the remaining image files F3, F2, and F1 are linked as lower-level image files to the image file F4. In addition, the first created image file F4 is linked as an upper-level image file to each of the three image files F3, F2, and F1. If the images captured through one shooting operation in the continuous shooting mode are grouped into a group and the link relation of the images of the group is recorded in this manner, conveniently checking and processing the images on a browser or the like in the future is possible.

Figure 8:
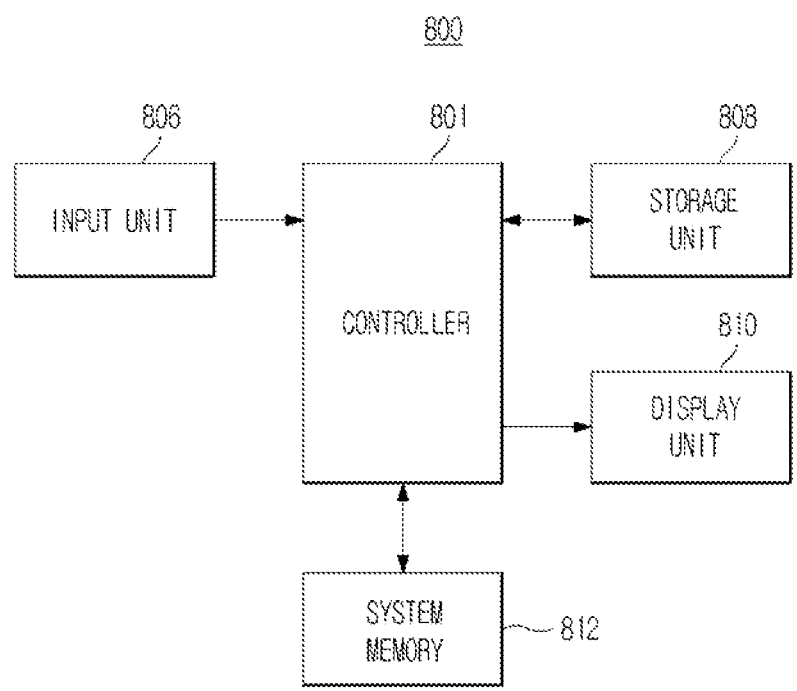
FIG. 8 illustrates a system to control an image processing device according to another embodiment of the present general inventive concept.

FIG. 8 illustrates a system to control an image processing device according to another embodiment of the present general inventive concept. The image processing device 800 of FIG. 8 includes a device that directly displays digital images such as a Personal Computer (PC), a laptop, or a Portable Multimedia Player (PMP), a device that displays digital images in an icon format or in a thumbnail format, or a device that executes an application program to edit digital images.

As illustrated in FIG. 8, an input unit 806 is electrically connected to an input of a controller 801 such that communication is possible therebetween. The input unit 806 allows the user to select an image file and to input image processing commands. The controller 101 controls the overall operation of the image processing device 800. System software to accomplish this is stored in a system memory 812. A display unit 810 displays digital images directly or in an icon or thumbnail format. Images handled in the image processing device 800 are stored in a storage unit 808 that is provided in the image processing device 800 and is electrically connected to the controller 801. Examples of the storage unit 808 used in the image processing device 800 include a hard disk drive, a memory card, an optical disc, and a magnetic tape.

The controller 801 of the image processing device 800 illustrated in FIG. 8 determines a link relation between image files created or processed at the image processing device 800 and records the determined link relation between the image files in metadata of each the image files. If a link relation of an image file that has already been recorded in metadata is changed, the controller 801 updates the link relation recorded in the metadata of the image file. The controller 801 is also involved in editing and storing images based on inputs from the user.

Figure 9:
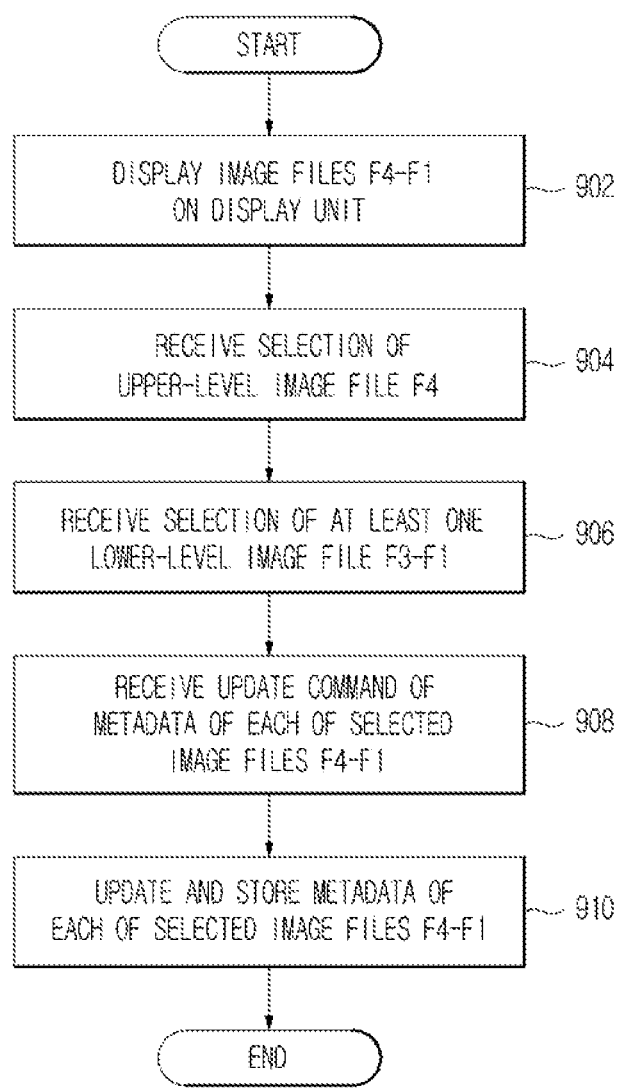
FIG. 9 illustrates a method to control an image processing apparatus according to another embodiment of the present general inventive concept.
Figure 10:
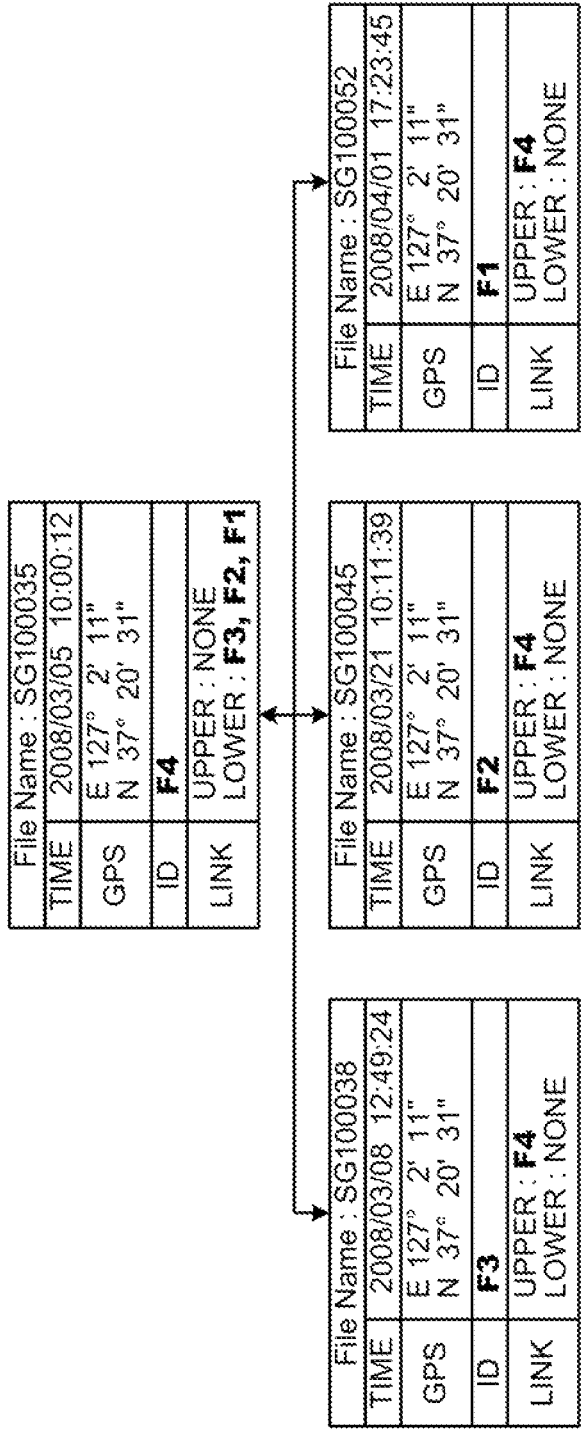
FIG. 10 illustrates link relations of image files created by the method to control an image processing apparatus illustrated in FIG. 9.

FIG. 9 illustrates a method to control an image processing apparatus according to another embodiment of the present general inventive concept and FIG. 10 illustrates link relations of image files created by the method to control an image processing apparatus illustrated in FIG. 9. In the method to control an image processing apparatus illustrated in FIG. 9, link relations between a plurality of image files displayed on the display unit 810 of the image processing device 800 are set based on user selection and selected image files are classified as a group.

As illustrated in FIG. 9, when the user selects a directory in which a plurality of image files F4-F1 is stored on the display unit 810 of the image processing device 800 (for example, a PC), the controller 801 displays the plurality of image files F4-F1 of the directory selected by the user on the display unit 810 (operation 902). Images of the image files may be directly displayed on the display unit 810 or may be displayed in an icon format or in a thumbnail format. When the user selects an image file (for example, F4) to be set as an upper-level image file among the plurality of image files F4, F3, F2, and F1 displayed on the display unit 810, the controller 801 receives the user selection of the upper-level image file (operation 904). Then, when the user selects at least one image file F3, F2, or F1 to be set as a lower-level image file from the image files F3, F2, and F1 other than the selected image file F4 among the plurality of image files F4, F3, F2, and F1 displayed on the display unit 810, the controller 801 receives the user selection of at least one lower-level image file (operation 906). When the selection of the image file F4 and the lower-level image files F3, F2, and F1 is completed, the user inputs an update command so as to reflect the selection of the upper and lower-level image files in each of the image files F4, F3, F2, and F1 and the controller 801 then receives the update command (operation 908). Upon receiving the update command, the controller 801 updates and stores a link relation LINK in metadata of each of the selected image files F4, F3, F2, and F1 (operation 910).

As a result of this procedure, the four image files F4, F3, F2, and F1 constitute one group. FIG. 10 illustrates relations between the image files F4, F3, F2, and F1 of the group constituted in this manner. As illustrated in FIG. 10, no upper-level image file is linked to the image file F4 that the user has selected as an upper-level image file from among the plurality of image files F4, F3, F2, and F1 and the image files F3, F2, and F1 that the user has selected as lower-level image files are linked as lower-level image files to the image file F4. In addition, the image file F4 that the user has selected as an upper-level image file is linked as an upper-level image file to each of the image files F3, F2, and F1 and no lower-level image file is linked to each of the image files F3, F2, and F1. The image files F4, F3, F2, and F1 are unlikely grouped together based on the creation time or the creation (GPS) position since the creation times and the creation positions of the image files are at very large intervals as can been seen from FIG. 10. However, the method to control an image processing apparatus according to the embodiment of the present general inventive concept as illustrated in FIGS. 9 and 10 can be applied when the user desires to arbitrarily group the plurality of image files F4, F3, F2, and F1 and to establish link relations therebetween. For example, this method can be applied when the user desires to collect and group photographs obtained by capturing an image of a specific person and to assign a link relation to each of the photographs.

Figure 11:
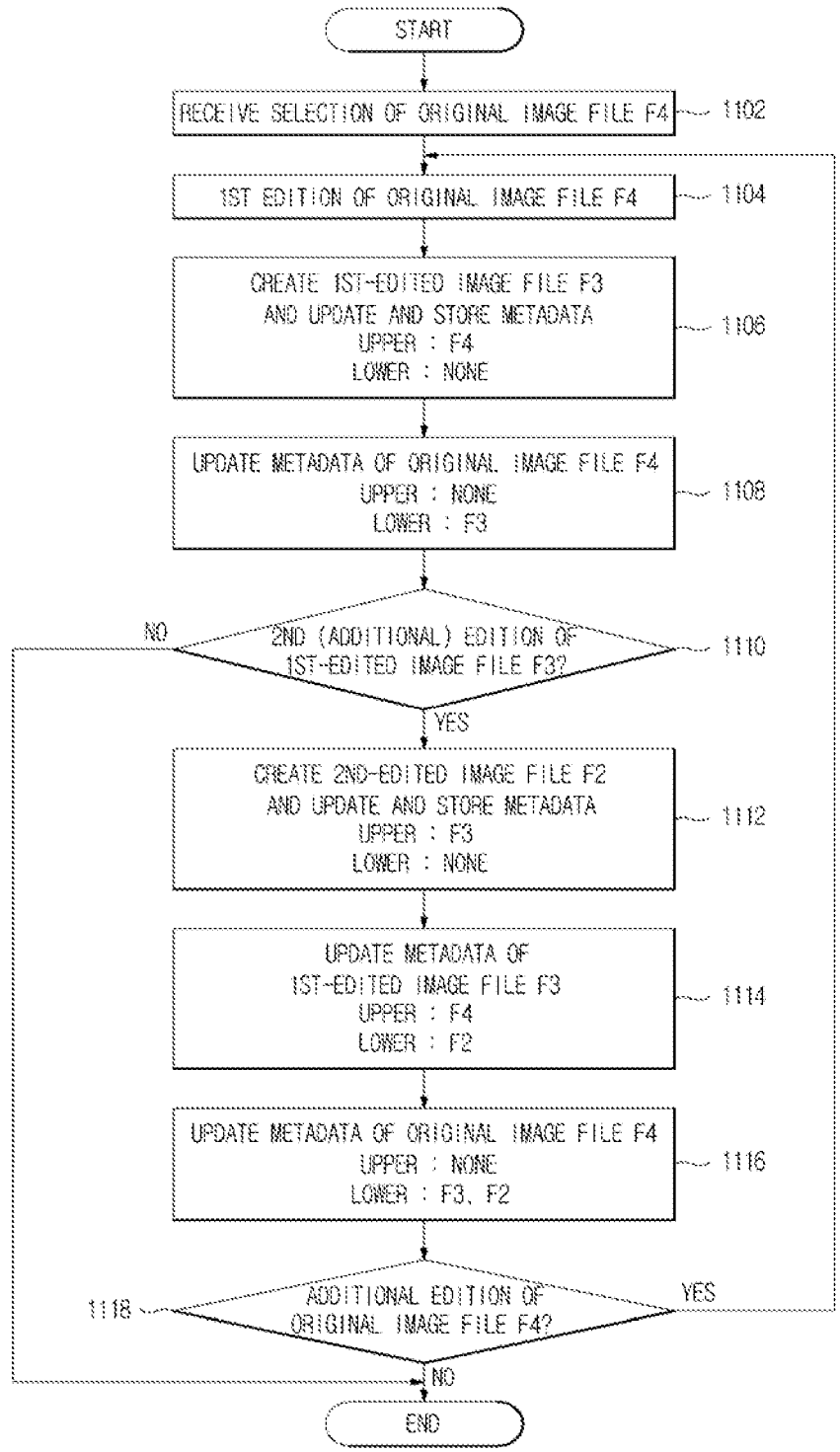
FIG. 11 illustrates a method to control an image processing apparatus according to another embodiment of the present general inventive concept.
Figure 12:
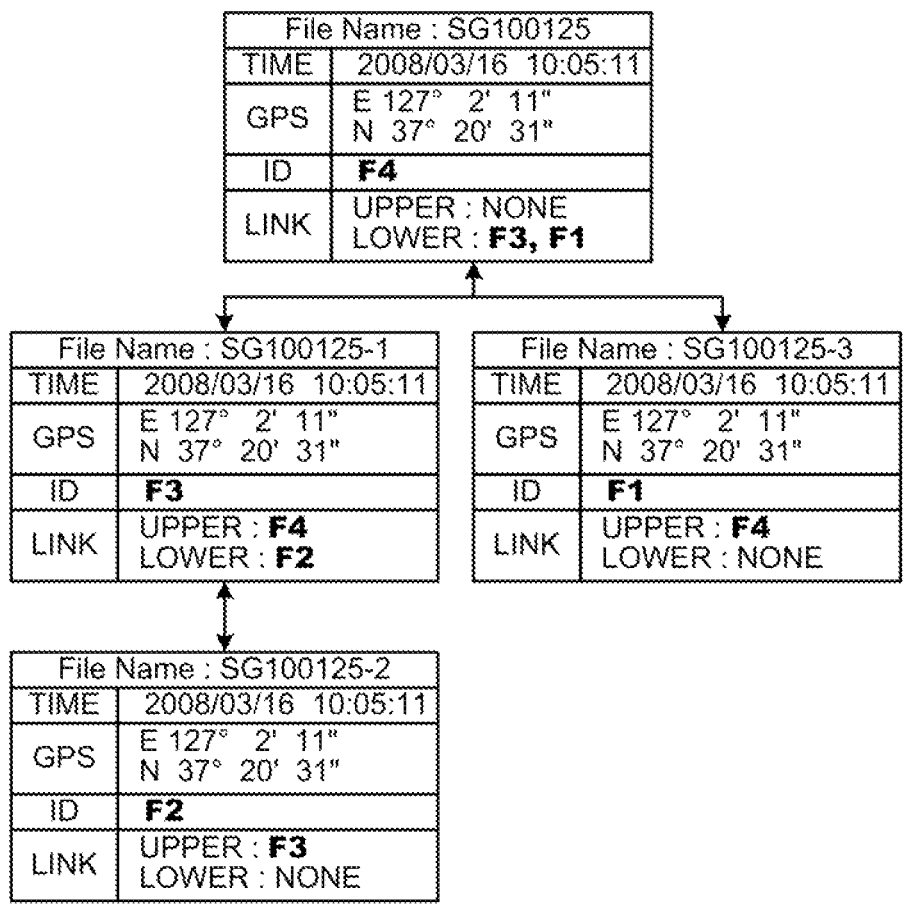
FIG. 12 illustrates link relations of image files created by the method to control an image processing apparatus illustrated in FIG. 11.

FIG. 11 illustrates a method to control an image processing apparatus according to another embodiment of the present general inventive concept and FIG. 12 illustrates link relations of image files created by the method to control an image processing apparatus illustrated in FIG. 11. In the method to control an image processing apparatus illustrated in FIG. 11, when the user opens an image file and edits a corresponding image, a link relation in metadata of each of the original image file and the edited image file is updated based on a link relation between the original image file and the edited image file.

As illustrated in FIG. 11, when the user selects an image file F4 to be edited on the display unit 810 of the image processing device 800 (for example, a PC), the controller 801 receives selection of the image file F4 (operation1102). Then, the user edits an image of the image file F4 through operation of the input unit 806 (operation1104). When the edition of the image file F4 is completed, the controller 801 creates a new image file F3 in which the edition is reflected and updates and stores metadata of the image file F3 (operation1106). That is, the controller 801 updates a link relation LINK in metadata of the image file F3 such that the original image file F4 is linked as an upper-level image file to the image file F3 newly created through the edition and no lower-level image file is linked to the image file F3. The controller 801 also updates metadata of the original image file F4 as the image file F3 is created (operation 1108). That is, the controller 801 updates a link relation LINK in metadata of the image file F4 such that no upper-level image file is linked to the original image file F4 and the newly created image file F3 is linked as a lower-level image file to the original image file F4.

The controller 801 then determines whether the user has additionally edited the image file F3 newly created through the edition by the user (operation 1110). If the user has additionally edited the image file F3 ("yes" in operation 1110), the controller 801 creates a new image file F2 in which the additional edition is reflected and updates and stores metadata of the image file F2 (operation 1112). The previously edited image file F3 is linked as an upper-level image file to the additionally edited image file F2 and no lower-level image file is linked to the image file F2. The controller 801 also updates a link relation LINK in the metadata of the previously edited image file F3 as the additionally edited image file F2 is created (operation 1114). That is, the controller 801 updates the link relation LINK in the metadata of the previously edited image file F3 such that the original image file F4 is linked as an upper-level image file to the image file F3 as in the previous edition and the image file F2 newly created through the additional edition is linked as a lower-level image file to the image file F3. The controller 801 also updates the link relation LINK in the metadata of the original image file F4 based on the change of the link relation as the additionally edited image file F2 is created (operation 1116). That is, no upper-level image file is linked to the original image file F4 and both the image file F2 newly created through the additional edition and the previously edited image file F3 are linked as lower-level image files to the original image file F4. If another edition is applied to the original image file F4 ("yes" in operation 1118), the controller 801 returns to the operation 1104 for initial edition of the original image file F4 to repeat operations 1104 to 1108.

As a result of this procedure, the four image files F4, F3, F2, and F1 constitute one group. FIG. 12 illustrates relations between the image files F4, F3, F2, and F1 of the group constituted in this manner. As illustrated in FIG. 12, the original image file F4 is edited to create a new image file F3 and the edited image file F3 is additionally edited to create a new image file F2 to establish link relations between the image files F3, F2, and F1. In addition, if the original image file F4 is additionally edited to create an image file F1, a new link relation is established between the additionally edited image file F1 and the original image file F4. This link relation is recorded in the link relation LINK in the metadata of each of the image files F4, F3, F2, and F1. That is, the previously edited image file F3 is linked as an upper-level image file to the additionally edited image file F2 and no lower-level image file is linked to the image file F2. The link relation LINK in the metadata of the previously edited image file F3 is also updated due to the creation of the additionally edited image file F2 (operation 1114). That is, the link relation LINK in the metadata of the image file F3 is updated such that the original image file F4 is linked as an upper-level image file to the previously edited image file F3 as in the previous edition and the image file F2 newly created through the additional edition is linked as a lower-level image file to the image file F3.

Figure 13:
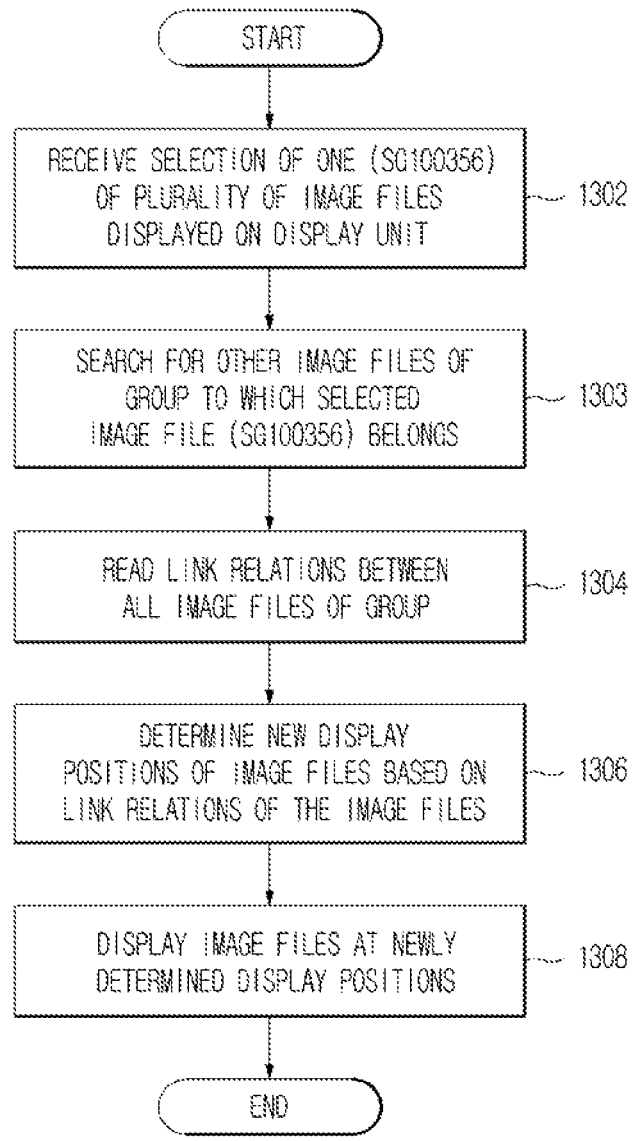
FIG. 13 illustrates a method to control an image processing apparatus according to an embodiment of the present general inventive concept.

FIG. 13 illustrates a method to control an image processing apparatus according to an embodiment of the present general inventive concept and FIG. 14 illustrates how image files are displayed according to the method to control an image processing apparatus illustrated in FIG. 13. In the method to control an image processing apparatus illustrated in FIG. 13, when the user selects one of a plurality of image files between which link relations have already been established, the controller 801 rearranges display positions of other image files belonging to the same group as that of the selected image file according to link relations between the image files and then displays the image files on the display unit. This allows the user to easily determine image files belonging to the corresponding group and link relations between the image files.

As illustrated in FIG. 13, the controller 801 receives the selection of an image file SG100356 among a plurality of image files displayed on the display unit 810 from the user (operation 1302). When the user selection is completed, the controller 801 searches for other image files of a group to which the selected image file SG100356 belongs (operation 1303). The controller 801 then reads a link relation LINK of each of the image files belonging to the found group (operation 1304). When both the group to which the image file SG100356 selected by the user belong and all image files of the group are obtained, the controller 801 determines new display positions of the image files based on the link relation LINK of each of the image files (operation 1306) and displays the image files at the newly determined display positions (operation 1308). In identifying link relations of the selected image files, displaying only image files of the corresponding group and not image files of other groups on the display unit is advantageous.

FIG. 14 illustrates a screen 1410*a* of the display unit before display positions of other image files of the group to which the image file SG100356 selected by the user belong are rearranged and a screen 1410*b* of the display unit after the rearrangement. Before the rearrangement, the image files are displayed in an arrangement in which identifying link relations between the image files by the user is difficult (see "1410*a*" in FIG. 14). When the rearrangement has been made according to the method to control an image processing apparatus according to the embodiment of the present general inventive concept, the user can easily identify the link relations between the image files of the group to which the selected image file SG100356 belongs (see "1410*b*" in FIG. 14). If a highlight or other special mark is applied to the uppermost-level image file SG100356 in addition to the rearrangement, the user can more easily identify the representative image file (for example, the image file SG100356 in FIG. 14) of the currently displayed group.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As is apparent from the above description, according to the present general inventive concept, a large number of image files are more easily and conveniently classified since linkage information representing relations between a plurality of image files is recorded as metadata in each of the plurality of image files.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A method to control an image processing apparatus, the method comprising:
displaying a plurality of image files, each including metadata in which linkage information representing a hierarchical relation with other image files is recorded, on a screen;
receiving a selection of one of the plurality of image files displayed on the screen;
searching for other image files belonging to a same group as the selected image file;
reading the linkage information of each of the other image files belonging to the same group as the selected image file; and
rearranging the display of the plurality of image files based on the selected image file, group information, and the read linkage information,
wherein the rearranged display includes the display of the selected image file and the display of the other image files belonging to the same group as the selected image file.

2. The method according to claim 1, wherein the linkage information recorded in the metadata of each of the plurality of image files includes information of levels, relative to the image file, of other image files of the plurality of image files, the relative levels being classified into upper and lower levels.

3. The method according to claim 2, wherein the plurality of image files are rearranged based on the relative levels of the plurality of image files.

4. The method according to claim 1, further comprising:
identifying image files satisfying a predetermined condition among the plurality of image files based on the linkage information.

5. The method according to claim 1, further comprising:
determining a link relation between the plurality of image files based on the linkage information.

6. The method according to claim 1,
receiving a determination of a relation between the plurality of image files;
obtaining linkage information representing a relation between the plurality of image files based on a selection made for the determination of the relation; and
recording the linkage information as metadata in each of the plurality of image files.

7. The method according to claim 6, wherein the linkage information recorded in the metadata of each of thq plurality of image files includes information of levels, relative to the image file, of other image files of the plurality of image files, the relative levels being classified into upper and lower levels.

8. The method according to claim 7, wherein the determination of the relation between the plurality of image files includes selecting an image file from the plurality of image files as an upper-level image file and selecting each of remaining image files among the plurality of image files as a lower-level image file.

9. The method according to claim 8, wherein the image processing apparatus includes a display unit to display the plurality of image files on a screen, and
the selection of the upper and lower-level image files of the plurality of image files is made through a user selection for the plurality of image files displayed on the screen of the display unit.

10. The method according to claim 1, wherein the linkage information including creation time and creation position of the image file.

11. An image processing apparatus, the apparatus comprising:
a display unit to display a plurality of image files, each including metadata in which linkage information representing a hierarchical relation with other image files is recorded, on a screen; and
a controller to receive a selection of one of the plurality of image files displayed on the screen, to search for other image files belonging to a same group as the selected image file, to read the linkage information of each of the other image files belonging to the same group as the selected image file, and to control the display unit to rearrange the display of the plurality of image files based on the selected image file, group information, and the read linkage information, wherein the rearranged display includes the display of the selected image file and the display of the other image files belonging to the same group as the selected image file.

12. The apparatus according to claim 11, wherein the linkage information recorded in the metadata of each of the plurality of image files includes information of levels, relative to the image file, of other image files of the plurality of image files, the relative levels being classified into upper and lower levels.

13. The apparatus according to claim 11, wherein the plurality of image files are rearranged based on the relative levels of the plurality of image files.

14. The apparatus according to claim 11, further comprising:
identifying image files satisfying a predetermined condition among the plurality of image files based on the linkage information.

15. The apparatus according to claim 11, further comprising:
determining a link relation between the plurality of image files based on the linkage information.

16. The apparatus according to claim 11,
receiving a determination of a relation between the plurality of image files;
obtaining linkage information representing a relation between the plurality of image files based on a selection made for the determination of the relation; and
recording the linkage information as metadata in each of the plurality of image files.

17. The apparatus according to claim 16, wherein the linkage information recorded in the metadata of each of the plurality of image files includes information of levels, relative to the image file, of other image files of the plurality of image files, the relative levels being classified into upper and lower levels.

18. The apparatus according to claim 17, wherein the determination of the relation between the plurality of image files includes selecting an image file from the plurality of image files as an upper-level image file and selecting each of remaining image files among the plurality of image files as a lower-level image file.

19. The apparatus according to claim 18, wherein the image processing apparatus includes a display unit to display the plurality of image files on a screen, and
the selection of the upper and lower-level image files of the plurality of image files is made through a user selection for the plurality of image files displayed on the screen of the display unit.

20. The apparatus according to claim 11, wherein the linkage information including creation time and creation position of the image file.

21. The method according to claim 1, wherein the rearranged display does not display image files not belonging to the same group as the selected image file.

22. The apparatus according to claim 11, wherein the rearranged display does not display image files not belonging to the same group as the selected image file.

* * * * *